Figure 1:
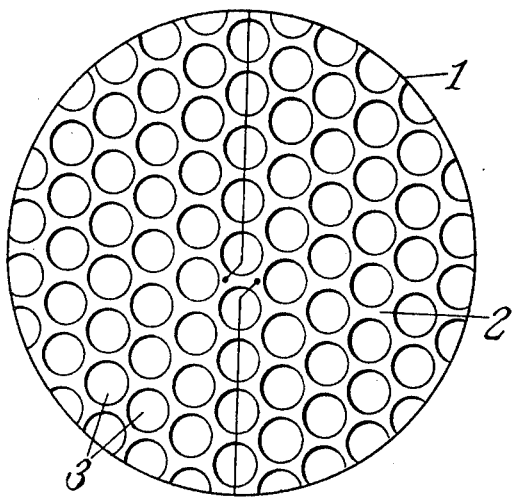

United States Patent [19]

Wilson

[11] 4,040,293
[45] Aug. 9, 1977

[54] FLUID FLOW MEASURING DEVICE

[75] Inventor: Alexander Connor Wilson, Marlow, England

[73] Assignee: Airflow Developments Limited, High Wycombe, England

[21] Appl. No.: 643,619

[22] Filed: Dec. 22, 1975

[51] Int. Cl.² .................................................. G01F 1/36
[52] U.S. Cl. ........................................ 73/211; 98/40 D; 165/11
[58] Field of Search ............... 73/211, 205 R, 198; 137/557; 98/40 B, 40 D; 165/11

[56] References Cited

U.S. PATENT DOCUMENTS

| | | | |
|---|---|---|---|
| 2,701,998 | 2/1955 | Wulle | 98/40 D |
| 2,929,248 | 3/1960 | Sprenkle | 73/211 X |
| 3,129,587 | 4/1964 | Hallanger | 73/211 |
| 3,640,307 | 2/1972 | Drzala | 73/205 R X |
| 3,680,376 | 8/1972 | Catheron | 73/211 |
| 3,714,884 | 2/1973 | Christiansen | 98/40 D |
| 3,838,598 | 10/1974 | Tompkins | 73/211 X |

Primary Examiner—Richard C. Queisser
Assistant Examiner—John P. Beauchamp

[57] ABSTRACT

A device for measuring the flow of a fluid in a pipe by creating an easily measurable pressure differential which is related to flow comprises a diaphragm transversely contained in the pipe or an associated branch pipe. The diaphragm has a multiplicity of closely spaced fluid flow holes which are so shaped as to increase fluid flow velocity through the diaphragm, and means are provided downstream faces of the diaphragm said means being intended to be connected to a differential pressure indicating or recording instrument from which a fluid flow measurement can be derived.

3 Claims, 6 Drawing Figures

4,040,293

FLUID FLOW MEASURING DEVICE

This invention relates to a device for measuring the flow of a fluid such as for instance air or other gas in a pipe or bore and has been devised with the object of providing a simple means for creating an easily measurable pressure differential, related to flow, with a low resistance to flow and readily adaptable to suit various cross-sectional shapes and areas of pipe or bore.

In the following description the term "air" should be read to mean air or any gas or fluid.

In accordance with the present invention there is provided a fluid flow measuring device comprising a pipe or bore, which transversely contains a diaphragm having a multiplicity of closely spaced fluid flow holes which are so shaped as to increase fluid flow velocity through the diaphragm and means for sensing fluid pressure at or adjacent the upstream faces of the diaphragm said means being intended to be connected to a differential pressure indicating or recording instrument from which a fluid flow measurement can be derived.

The internal profile of the holes is preferably such that the change in velocity takes place smoothly with negligible loss of total energy. One typical and preferred form of hole is of nozzle form having a bell mouthed entrance leading to a parallel cylindrical section.

The holes in the diaphragm may be of circular or other cross-section and are disposed in any convenient pattern which may take the form of a "honeycomb" or similar arrangement, so that when the air emerges from the diaphragm at increased velocity it is in the form of a multiplicity of closely spaced jets which rapidly coalesce as they proceed downstream to form a reasonably uniform flowing mass in the pipe or bore. This results in a relatively high conversion of velocity energy back to static pressure. It has thus been found, by use of temporary pressure sensors, that the overall pressure drop of the device as measured between points of reasonably uniform flow on the upstream and downstream sides is substantially less than the pressure differential measured as now proposed by means of a hole or series of holes preferably facing the flow on the upstream face of the diaphragm and a hole or series of holes at right angles to the flow or facing partially or wholly downstream or otherwise arranged for static pressure measurement on the downstream face of the diaphragm. Thus, it was discovered in accordance with the present invention, that if sensing tubes are placed immediately on the upstream and downstream faces of a specially constructed diaphragm, in accordance with the present invention, a pressure differential is obtained between the upstream and downstream measuring points.

When a differential pressure indicating or recording instrument such as a manometer is connected by any suitable arrangement of tubes to the sensing means on the upstream and downstream faces of the diaphragm its reading may be converted to one of velocity or mass flow by the use of a factor relating to the characteristics of the diaphragm device and the fluid flowing and if the fluid density and viscosity are substantially constant the scale of the instrument may be arranged to read directly in velocity or mass flow units.

One other purpose of a diaphragm having a multiplicity of closely spaced and shaped holes as already mentioned is to act as a flow straightening or smoothing device thus reducing turbulence and, in some applications, pressure loss. For instance, when placed in a branch pipe of an air system at or near the point where air enters it from a main air flow duct it can control the flow so as to reduce, substantially, the turbulence and maldistribution which would otherwise occur downstream of the junction. Furthermore, if placed slightly upstream from a grille or diffuser it can be so arranged as to ensure satisfactory entry conditions to the grille or diffuser and therefore satisfactory discharge conditions from the grille or diffuser.

Yet another purpose of a diaphragm containing a multiplicity of shaped holes as already described above is to act as a sound attenuator if constructed of suitable materials. Alternatively, the device may be used in conjunction with another device, having a matching series of holes, designed for sound attenuation.

Figure 2:
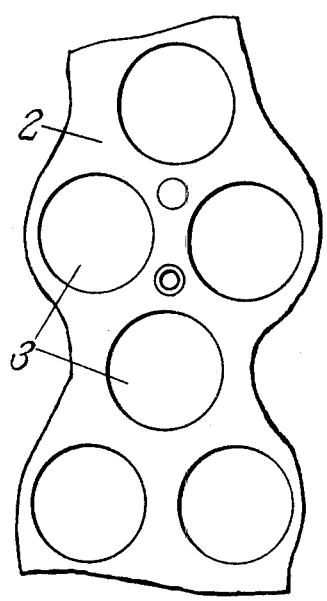
Figure 3:
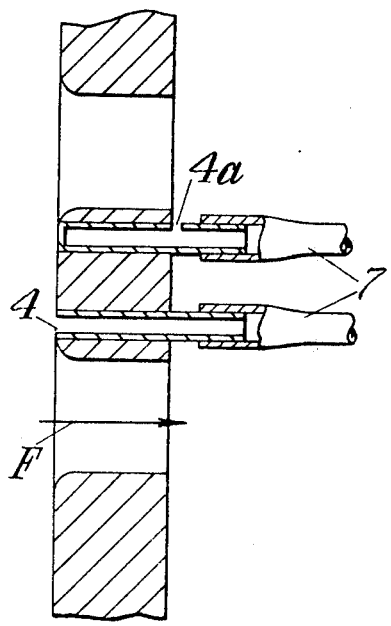

The accompanying drawings illustrate alternative fluid flow measuring devices according to the invention and their mode of use. In these drawings:

FIG. 1 is a diagrammatic cross-section of an air flow pipe 1 equipped with a diaphragm 2 having a multiplicity of holes 3;

FIG. 2 is an enlarged fragmentary elevation of the diaphragm;

FIG. 3 is a transverse section corresponding to FIG. 2 showing a tapping point 4 on the upstream side of the diaphragm facing the direction of fluid flow and a tapping point 4a on the downstream side of the diaphragm lateral to the fluid flow. Each tapping point has a connection 7 to a manometer, the arrow F indicating the direction of intended air flow through the diaphragm 2.

Figure 4:
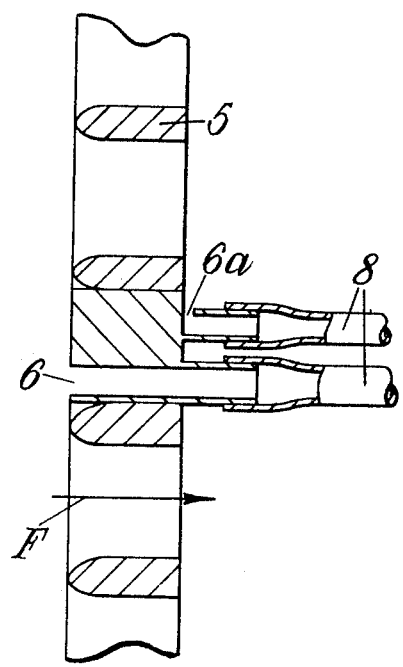
Figure 5:
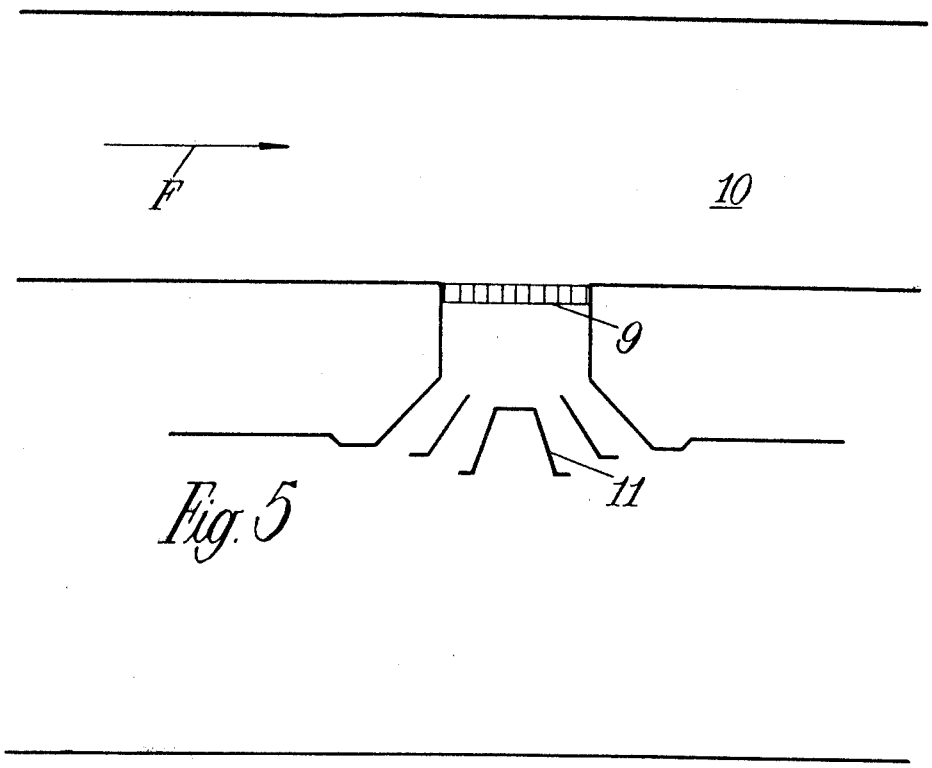
Figure 6:
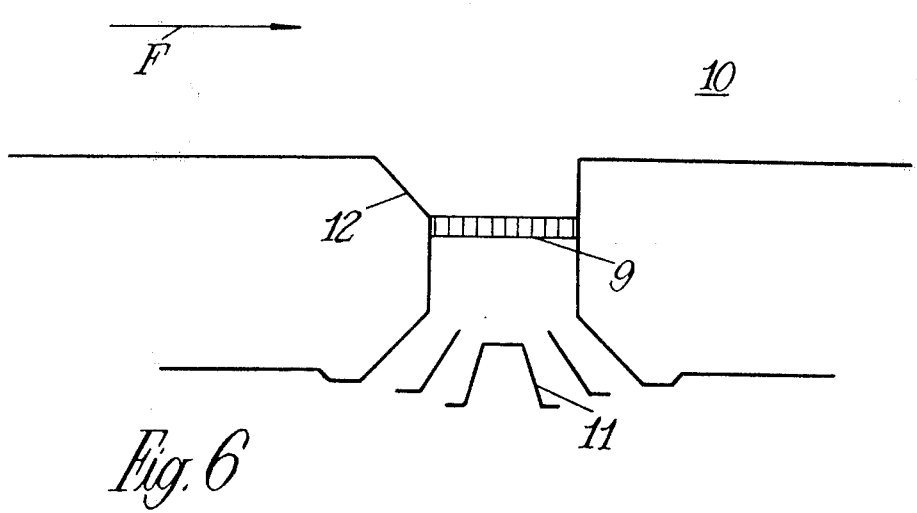

FIG. 4 is a similar transverse section through another form of diaphragm 5 showing an alternative scheme of tapping points 6 and 6a with connections 8 to a manometer;

FIGS. 5 and 6 show two alternative modes of installation of a diaphragm device 9 including pressure sensing tubes in a branch pipe from the side wall of a main air flow pipe 10. In each instance there is an associated diffuser 11 downstream of the diaphragm. It should be noted that in the FIG. 6 installation the diaphragm device is recessed in the side branch 11 which has a chamfered upstream corner or shoe 12.

It should be understood that the diaphragm may be formed by moulding or by casting or be otherwise fabricated and that the holes need not necessarily have a circular cross-section or be of the same size. The perforations could, for instance, be of elongated form or of hexagonal or other polygonal form. Alternatively, the diaphragm could be constructed in any combination of solid or hollow members arranged in "egg box", parallel or other form to provide the necessary velocity increase and to provide convenient means for connecting single or multiple pressure tappings to a manometer or other differential pressure indicating or recording instrument.

It may be convenient in some circumstances to arrange the fixing of the pressure tapping points for both upstream and downstream pressure connection in one or more plugs which are inserted into the former holes in the diaphragm, as shown in FIG. 3.

I claim:

1. A fluid-flow measuring device comprising a tubular member; a diaphragm in said tubular member and having a multiplicity of closely spaced fluid flow holes, said holes having bellmouthed entrances merging into parallel cylindrical sections: fluid pressure sensing tubes opening at the upstream and downstream faces of said diaphragm with the opening of the upstream pressure sensing tube facing the direction of fluid flow, the opening of the downstream pressure sensing tube facing laterally and at least partly downstream relative to the fluid flow, the pressure sensing tubes being connectable to a differential pressure indicating or recording instrument from which a fluid measurement can be derived.

2. A device according to claim 1 and placed in a branchpipe of a fluid flow system at or near the junction of that branchpipe with a main air flow pipe.

3. A device according to claim 2 wherein the upstream corner of said branchpipe is chamfered.

* * * * *